United States Patent [19]

Reschlein

[11] Patent Number: 5,391,049
[45] Date of Patent: Feb. 21, 1995

[54] DUAL PLATE CATCHER FOR USE IN A COMPONENT STACKER

[76] Inventor: William C. Reschlein, 1608 Cynthia Dr., Rockford, Ill. 61107

[21] Appl. No.: 110,993

[22] Filed: Aug. 24, 1993

[51] Int. Cl.⁶ .............................................. B65G 57/30
[52] U.S. Cl. .................................. 414/795.3; 16/365; 16/374; 16/392
[58] Field of Search ............... 414/795.3; 16/365, 374, 16/392

[56] References Cited

U.S. PATENT DOCUMENTS

| | | | |
|---|---|---|---|
| 3,459,462 | 8/1969 | Barnard et al. | 16/374 X |
| 3,622,017 | 11/1971 | Meuller et al. | 414/795.3 X |
| 3,826,389 | 7/1974 | Godfrey et al. | 414/795.3 X |
| 4,332,055 | 6/1982 | Rudnick et al. | 16/392 X |

OTHER PUBLICATIONS

Advertisement published by Raco Enterprises and entitled "#29271 Stacker Hinges".

Primary Examiner—William Grant
Attorney, Agent, or Firm—Leydig, Voit & Mayer, Ltd.

[57] ABSTRACT

A catcher for use in a component stacker for holding stacks of product die-cut from a continuous sheet of material. The catcher includes two catcher plates attached to a pivot pin for upward and downward pivoting between generally horizontal and generally vertical positions, thereby providing support for adjacent edges of two adjacent stacks of product.

4 Claims, 3 Drawing Sheets

DUAL PLATE CATCHER FOR USE IN A COMPONENT STACKER

BACKGROUND OF THE INVENTION

This invention relates to a catcher for use in a stacker machine for holding a stack of die-cut components.

In general, such a machine comprises a stacker board having a plurality of windows and catchers, a plurality of lifters located below the stacker board, and means of advancing a continuous web of product between the lifters and the board.

In operation, the web is advanced over the lifters, and the individual products contained therein are aligned with the lifters. The lifters advance upwardly, stripping the products from the web and shifting them upwardly through the vertically aligned windows in the stacker board to engage the bottom of stacks of previously removed products. When the lifters retract downwardly through the windows, the stacks of product engage catchers and are supported above the windows. This operation is repeated with additional product being added to the bottom of the stacks.

Each catcher is capable of supporting one side of one stack of products. Accordingly, each stack of products requires at least two catchers for support. As a result, a web containing multiple rows and columns of product requires numerous sets of catchers.

SUMMARY OF THE INVENTION

The general aim of the present invention is to provide a catcher for a stacker of the above general type which provides support for adjacent sides of two adjacent stacks of product, thereby reducing the number of catchers needed.

A more detailed object of the invention is to achieve the foregoing by having a catcher formed with two catcher plates operably extending over two adjacent windows in a stacker board, the two plates being supported by a single pin for upward and downward pivoting between generally horizontal and generally vertical positions.

The invention also resides in the relatively simple and inexpensive construction of the single catcher with dual catcher plates.

These and other objects and advantages of the invention will become more apparent from the following detailed description when taken in conjunction with the accompanying drawings.

Figure 1:
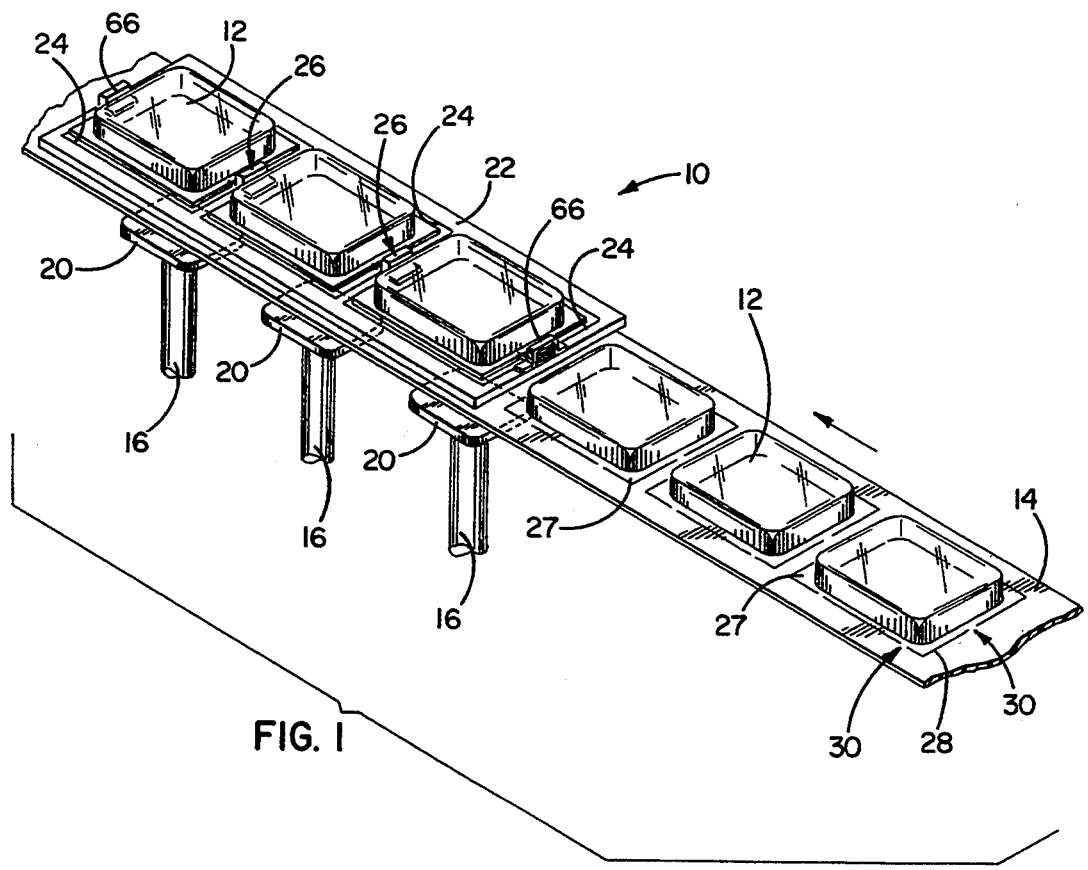
FIG. 1 is a schematic perspective view of a component stacker equipped with catchers incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in conjunction with a component stacker 10 for stacking plastic blister packs 12 die-cut from a continuous sheet or web 14 of plastic material.

The stacker includes a plurality of upwardly directed lifters 16 spaced equal distances apart and having generally horizontal platens 20 attached to the top thereof. A stacker board 22 located in a horizontal plane above the lifters is formed with a plurality of windows 24 vertically aligned with the lifters. The stacker board includes catchers 26 supported on the top of the board between the adjacent windows. The continuous plastic web 14 of integral blister packs 12 is located in a horizontal plane between the stacker board and the lifters. Each blister pack includes a lower flange 27 having a perimeter 28 die-cut from the web and formed with short tabs 30 to temporarily retain the pack in the web.

In its general operation, the component stacker 10 advances the web 14 forwardly to a dwell position in which one of the blister packs 12 is centered directly above each of the platens 20. The lifters 16 extend upwardly so that each platen engages the blister pack (FIG. 2) located directly above. The upward movement of the lifters severs the retaining tabs 30, thereby stripping the blister packs from the web. The packs are pushed upwardly through the vertically aligned windows 24 in the board 22 to engage the bottom of the packs (not shown) previously removed from the web and suspended above the board. After extending fully, the lifters retract downwardly (FIG. 3), whereby the lower ends of the stacks of blister packs engage the catchers 26 so as to be supported above the windows. After the lifters completely retract, the web is forwardly advanced and the process is repeated.

Figure 4:
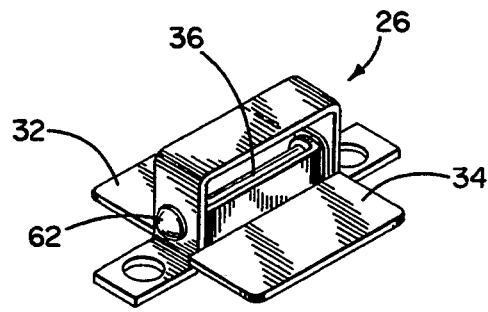
FIG. 4 is an enlarged perspective view of a catcher incorporating the unique features of the present invention.

The present invention contemplates a dual catcher 26 (FIG. 4) for use in a stacker 10 of the above general type. The catcher operates as a hinge with first and second catcher plates 32, 34 attached to a single pivot pin 36 for upward and downward pivoting between generally horizontal and generally vertical positions.

Figure 5:
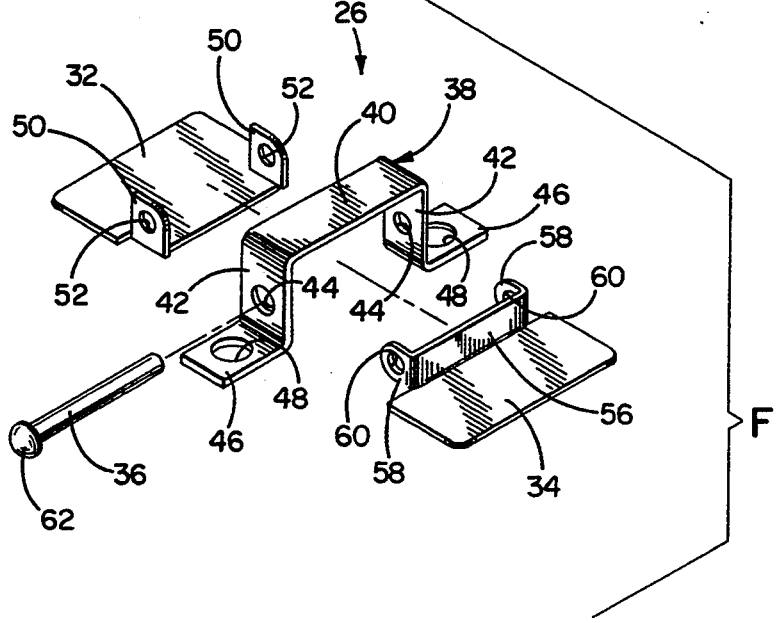
FIG. 5 is an exploded perspective view of the catcher shown in FIG. 4.

More specifically, the catcher 26 comprises a mounting bracket 38 (FIG. 5) in the form of a U-shaped yoke. The bracket is formed with a bridge 40 having two ends and a leg 42 depending from each of the ends. A horizontally extending hole 44 is formed in each leg such that each hole is axially aligned with the other. Each of the depending legs terminates in a lower outwardly projecting foot 46, the two feet being in the same horizontal plane and each having a mounting hole 48 formed vertically therethrough.

The first plate 32 of the catcher 26 is substantially flat and is formed with parallel ears 50 extending generally upwardly from opposite sides of the rear end portion of the plate, the ears being formed with axially aligned horizontally extending holes 52.

The second plate 34 also is substantially flat and its forward portion is formed with a vertically extending flange 56 terminating at both ends in forwardly extending parallel ears 58. The ears are formed with axially aligned horizontally extending holes 60 and are spaced inwardly from opposite side edges of the plate.

Figure 6:
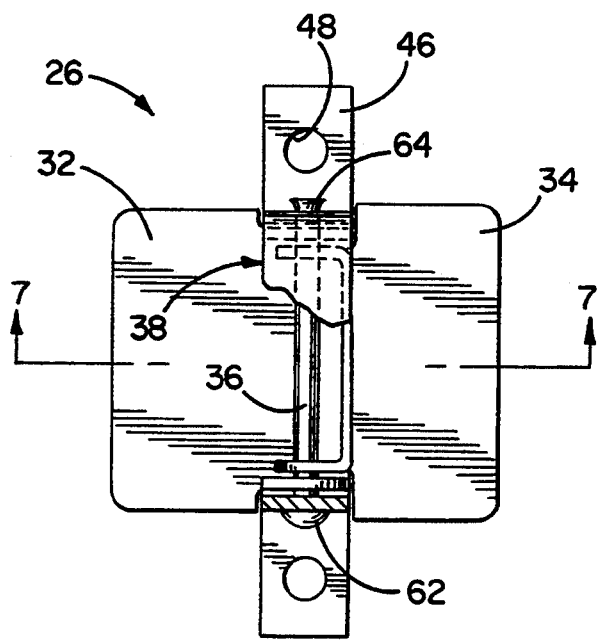
FIG. 6 is an enlarged top view of the catcher shown in FIG. 4, with certain parts broken away and shown in section.

The ears 50, 58 of each of the plates 32, 34, respectively, are spaced along the pivot pin 36 and are located inboard of the legs 42 of the bracket 38 such that the ears 58 of the second plate 34 are inboard of the ears 50 of the first plate 32. The horizontal holes 44 in the legs of the bracket, and the holes 52, 60 in the ears of the first and the second plate are axially aligned to receive the pivot pin 36. The pin is formed with a head 62 at one end. The other end of the pin is swaged as indicated at 64 in FIG. 6 in order to secure the pin in the bracket after the plates and the pin have been assembled with the bracket.

Figure 7:
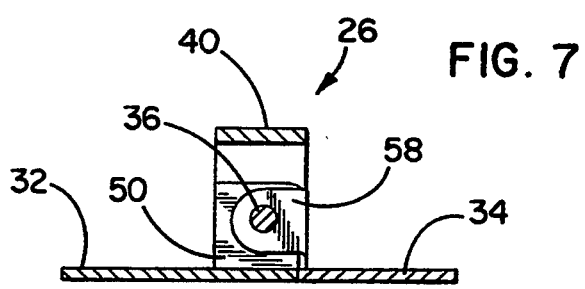
FIG. 7 is a cross-section taken along the line 7-7 of FIG. 6.

The catchers 26 are attached to the top surface of the stacker board 22 between the windows 24 by means of screws (not shown) extending through the mounting holes 48 in the feet 46 of the bracket 38. The catcher plates 32, 34 extend horizontally an equal distance in opposite directions over the adjacent windows in the board (best shown in FIG. 3). The rear edge of the plate 32 and the forward edge of the plate 34 engage the legs 42 of the bracket so that the plates normally are held in the same generally horizontal plane (FIG. 7).

Figure 2:
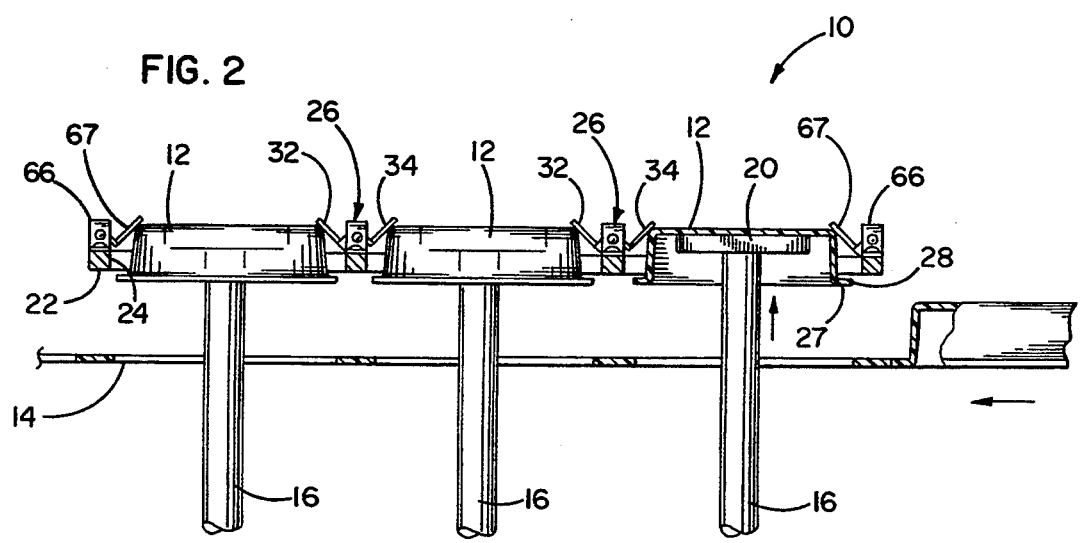
FIG. 2 is a side view of the component stacker shown in FIG. 1, with certain parts shown in section.
Figure 3:
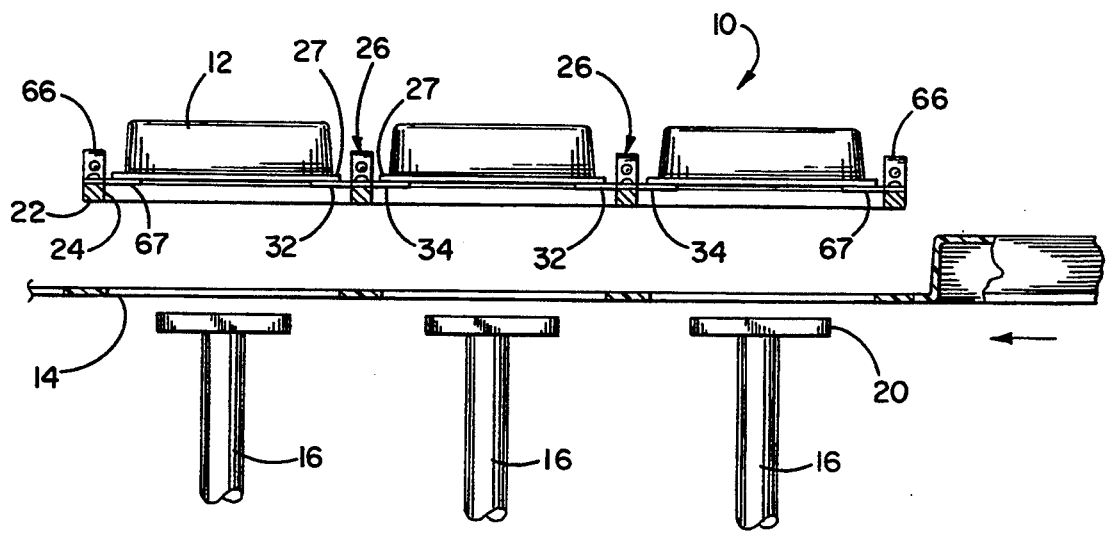
FIG. 3 is similar to FIG. 2, but with certain parts in moved positions.
Figure 8:
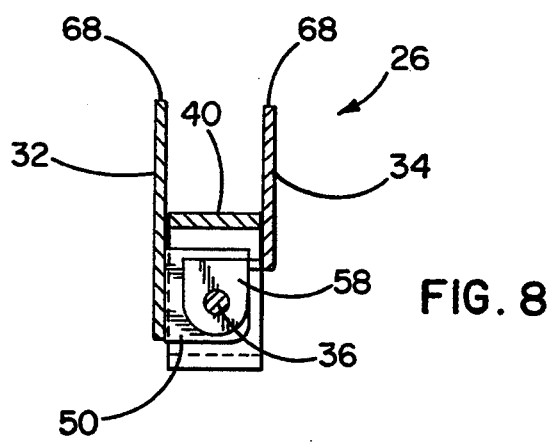
FIG. 8 is similar to FIG. 7 but shows certain parts in moved positions.

In operation, the lifters 16 of the stacker 10 elevate the blister packs 12 such that the top surfaces of the adjacent packs and then the flanges 27 thereof engage the bottoms of the plates 32, 34 (see FIG. 2). The plates hinge on the pin 36 and swing upwardly to generally vertical positions (FIG. 8) until the flanges progress vertically beyond the free edges 68 of the plates. Thereafter, gravity returns the plates to their generally horizontal positions (FIG. 7). As the lifters are retracted downwardly, the bottom surfaces of the flanges 27 of the adjacent packs engage the top of the plates 32, 34 and are supported above the windows 24 as the lifters 16 continue downwardly (FIG. 3).

As described above, the dual catchers 26 incorporating the unique features of the present invention are adapted for supporting adjacent ends of two adjacent stacks of components above adjacent windows 24. To support the ends of the product stacks located adjacent the ends of the stacker board, single catchers 66 (FIGS. 1-3) each having a single catcher plate 67 can be used.

The use of the dual catchers 26 in the center portion of the board, however, enables adjacent ends of the two adjacent stacks to be caught by one self-contained unit rather than incurring the expense of providing two separate single units for this purpose.

I claim:

1. A catcher for use in a stacker for stacking components die cut from a continuous web of material, said catcher comprising;
   a mounting bracket in the form of a generally U-shaped yoke,
   a pivot pin, and
   first and second catcher plates attached to said bracket by said pin, normally extending generally horizontally from opposite sides of said bracket and supported by said pin for upward and downward pivoting between generally horizontal and generally vertical positions., said first plate being formed with two upwardly extending ears spaced along said pin, and said second plate having an upwardly extending flange terminating in two ears disposed generally perpendicular to said flange and spaced along said pin.

2. A catcher as described in claim 1, where said first and second plates each have an edge engageable with said bracket and normally supporting said plates generally horizontally.

3. A catcher for use in a stacker for stacking components die cut from a continuous web of material, said catcher comprising;
   a mounting bracket in the form of a generally U-shaped yoke, said bracket having a bridge with two ends and a leg depending from each of said ends, said legs having aligned holes and being formed with oppositely facing feet each having a mounting hole therein,
   a pivot pin having two ends;
   first and second catcher plates attached to said bracket by said pin, normally extending generally horizontally from opposite sides of said bracket and supported by said pin for upward and downward pivoting between generally horizontal and generally vertical positions;
   said first plate being formed with two upwardly extending ears spaced along said pin and located inboard of said legs, said ears having axially aligned holes to pivotally receive said pin, said first plate having an edge engageable with said bracket and normally supporting said first plate generally horizontally;
   said second plate being formed with an upwardly extending flange terminating in two ears disposed generally perpendicular to said flange, the ears of said second plate having holes therein, being spaced along said pin and being located inboard of said ears of said first plate to pivotally receive said pin, and said second plate having an edge engageable with said bracket and normally supporting said second plate generally horizontally;
   said pin passing through said aligned holes in said bracket and said holes in said ears of both said first and second plates; and
   means on the ends of said pin and retaining said pin axially in said bracket.

4. The combination of (a) a component stacker and (b) a catcher for stacking components die cut from a continuous web of material, said stacker comprising a support having a plurality of adjacent windows formed vertically therethrough, a plurality of lifters movable upwardly through said windows and operable to punch successive components upwardly from said web and above said support to engage said catcher, said catcher comprising:
   a mounting bracket in the form of a generally U-shaped yoke, said bracket having a bridge with two ends and a leg depending from each of said ends, said legs having aligned holes and being formed with oppositely facing feet each having a mounting hole therein,
   a pivot pin formed with a head on one end and terminating in an opposite swaged end;
   first and second catcher plates attached to said bracket by said pin, normally extending generally horizontally from opposite sides of said bracket and supported by said pin for upward and downward pivoting between generally horizontal and generally vertical positions;

said first plate being formed with two upwardly extending ears spaced along said pin and located inboard of said legs, said ears having axially aligned holes to pivotally receive said pin, said first plate having an edge engageable with said bracket and normally supporting said first plate generally horizontally;

said second plate being formed with an upwardly extending flange terminating in two ears disposed generally perpendicular to said flange, the ears of said second plate having holes therein, being spaced along said pin and being located inboard of said ears of said first plate to pivotally receive said pin, and said second plate having an edge engageable with said bracket and normally supporting said second plate generally horizontally;

said pin passing through said aligned holes in said bracket and said holes in said ears of both said first and second plates, so that said head and said swaged end retain said pin in said bracket.

* * * * *